United States Patent
Lowe

(10) Patent No.: US 11,026,769 B2
(45) Date of Patent: Jun. 8, 2021

(54) DENTAL INSERT

(71) Applicant: Michael Lowe, Victoria (CA)

(72) Inventor: Michael Lowe, Victoria (CA)

( * ) Notice: Subject to any disclaimer, the term of this patent is extended or adjusted under 35 U.S.C. 154(b) by 287 days.

(21) Appl. No.: 16/257,199

(22) Filed: Jan. 25, 2019

(65) Prior Publication Data

US 2020/0069398 A1     Mar. 5, 2020

(30) Foreign Application Priority Data

Aug. 30, 2018   (CA) ................................. CA 3015903

(51) Int. Cl.
*A61C 8/00*      (2006.01)

(52) U.S. Cl.
CPC .......... *A61C 8/0057* (2013.01); *A61C 8/0093* (2013.01); *A61C 8/0037* (2013.01); *A61C 2008/0084* (2013.01); *B32B 2274/00* (2013.01)

(58) Field of Classification Search
CPC ..... A61C 8/0037; A61C 8/005; A61C 8/0057; A61C 8/008; A61C 8/0089; A61C 8/0093; A61C 2008/0084; B32B 2274/00
USPC ........................................................ 433/173
See application file for complete search history.

(56) References Cited

U.S. PATENT DOCUMENTS

| | | | | |
|---|---|---|---|---|
| 6,767,209 B1 * | 7/2004 | Tomita | ..................... | A46B 1/00 132/329 |
| 9,357,837 B2 * | 6/2016 | Henderson | .......... | A61C 17/3418 |
| 2014/0173839 A1 * | 6/2014 | Henderson | ................ | A46D 3/00 15/22.1 |
| 2014/0194837 A1 * | 7/2014 | Robinson | .......... | A61F 13/00068 604/319 |
| 2018/0055724 A1 * | 3/2018 | Slocum | ................... | A61H 15/02 |
| 2018/0333615 A1 * | 11/2018 | Kessler | ................... | A63B 41/08 |
| 2019/0110871 A1 * | 4/2019 | Frydrychewicz | .... | A61C 8/0031 |
| 2019/0125623 A1 * | 5/2019 | Spratt | ................ | A61H 15/0092 |

OTHER PUBLICATIONS https://www.medicalandjanitorialsupply.com/images/virtuemart/product/COTTON-BALL.jpg, Large cotton balls.
https://www.55dental.com/itemdetails.asp?mod=DCl9950&gclid=EAlalQobChMlxs_QrezK4QlVFo7lCh1AKwd4EAQYCiABEgJai_D_BwE, TapeTeflon 1/4".
https://www.supplyclinic.com/items/pfizer-gelfoam-absorbable-sterile-hemostatic-dental-sponge-12-12-bx-pfizer-1545?utm_source=google-shopping& . . . , Pfizer Gelfoam Absorbable Sterile Hemostatic Dental Sponge #12, 12/bx.
https://www.dentalcity.com/product/12731/zirc-steri-endo-guard-foam-inserts?69-903&gclid=EAlalQobChMllJiEq_fK4QlVDYnlCh1_gTXEAQYAiABEg . . . , Zirc—Steri-Endo Guard Foam Inserts Zirc—Steri-Endo Guard Foam Inserts.

* cited by examiner

*Primary Examiner* — Matthew M Nelson
(74) *Attorney, Agent, or Firm* — Finch & Maloney, PLLC; Michael J. Bujold

(57) ABSTRACT

A dental insert consists of a spherical body of a medical grade elastomer. The body has a circumference with a plurality of outwardly extending projections of uniform size and shape distributed evenly about the circumference. The body is not more than 10 mm in diameter, as measured from an outer extremity of the projections. This dental insert has application in implant dentistry and endodontics.

3 Claims, 3 Drawing Sheets

DENTAL INSERT

FIELD

There is described an insert that is used by dentists to block an opening, either temporarily while a procedure is being performed or permanently. This dental insert has application in dental implants, endodontics and may have other dental applications.

BACKGROUND

A dental implant is a surgical component that integrates with the bone of the maxilla or mandible to support a dental prosthesis such as a crown, bridge or denture. An abutment is fitted to the top of the dental implant to provide as an external connection. The abutment has a screw access channel. It is important to protect the screw access channel from contaminants. The screw access channel is currently protected by dentists through the temporary use of cotton pellets or Teflon tape.

SUMMARY

There is provided a dental insert which consists of a spherical body of a medical grade elastomer. The body has a circumference with a plurality of outwardly extending projections of uniform size and shape distributed evenly about the circumference. The body is not more than 10 mm in diameter, as measured from an outer extremity of the projections.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
FIG. 1 is a perspective view of a dental insert, contrasted in size with a dime.

A dental insert generally identified by reference numeral 10, will now be described with reference to FIG. 1 through FIG. 3.

Figure 2:
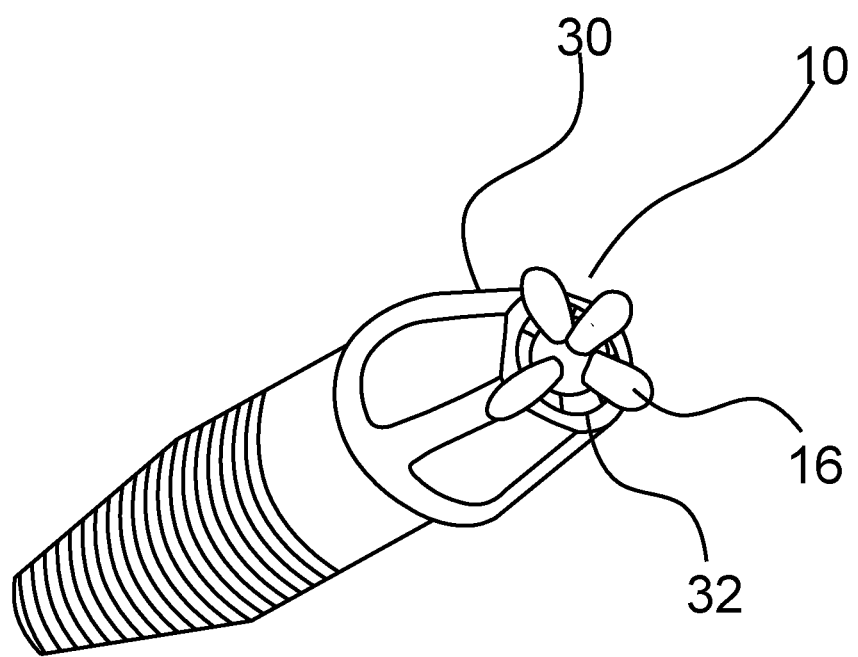
FIG. 2 is a perspective view of the dental insert of FIG. 1, positioned to block a screw access channel of a dental implant.

Structure and Relationship of Parts:

Referring to FIG. 1, dental insert 10 consists of a spherical body 12 of a medical grade thermoplastic elastomer (TPE). Body 12 has a circumference 14 with a plurality of outwardly extending projections 16 of uniform size and shape distributed evenly about circumference 14. Body 12 is not more than 10 mm in diameter, as measured from an outer extremity 18 of projections 16. The preferred form of projections 16, as illustrated, are resilient flexible spikes.

Operation:

The use of dental insert 10 as described above with reference to FIG. 1 through 3, will now be discussed. Referring to FIG. 2, dental insert 10 is inserted into screw access channel 32 of an abutment 30 of a dental implant. Projections 16 are flexible to accommodate the shape and size of screw access channel 32 and retain body 12 in place.

Dental insert 10 blocks screw access channel 32 to prevent contaminants from entering screw access channel 32.

Figure 3:
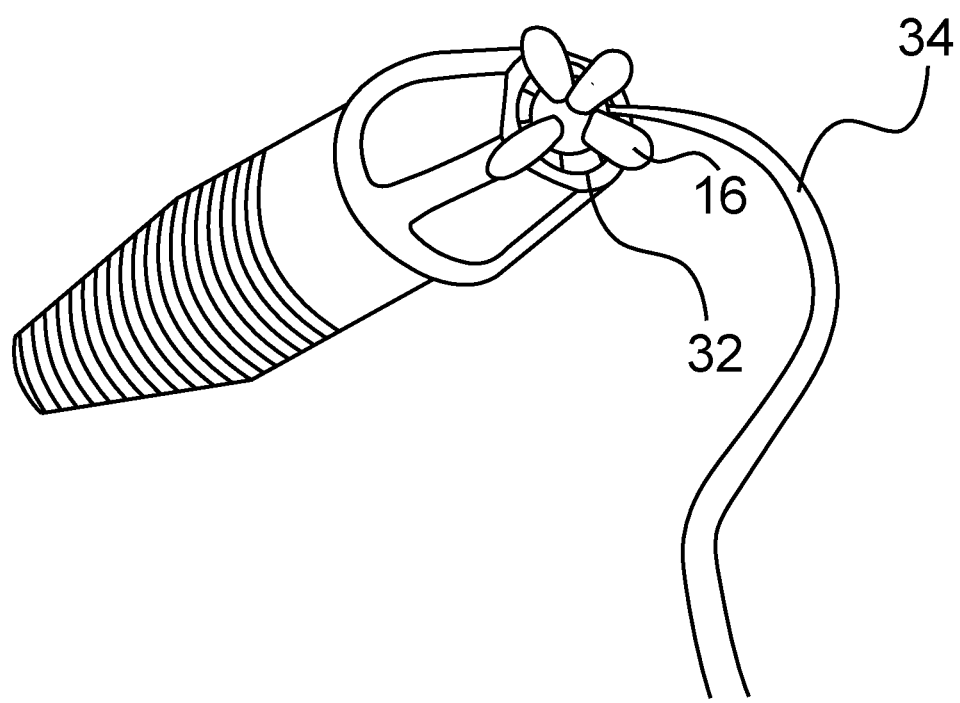
FIG. 3 is a perspective view of the dental insert of FIG. 2, being removed from the screw access channel of the dental implant with an explorer hook.

Referring to FIG. 3, once dental insert has served its intended purpose, it is removed. Removal is accomplished by using a dental instrument, such as an explorer hook 34, to hook projections 16 and pull body 12 from screw access channel 32. It will be recognized that there are other dental instruments which might also be used, such as a slow speed burr.

Advantages:

1. Cotton pellets and Teflon tape can be difficult and messy to remove. The insert described above is relatively easy to remove by using explorer hook 34 to engage projections 16 of dental insert 10.

2. Cotton pellets and Teflon tape absorb bodily fluids and can become a breeding ground for bacteria. Dental insert 10, as described above, is made from a medical grade elastomer and is relatively more sanitary.

3. While cotton pellets and Teflon tape can only be used as a temporary measure, dental insert 10 may be left in position permanently in some situations.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A combination, comprising:
   a dental implant that integrates with the bone of the maxilla or mandible to support a dental prosthesis, the dental implant having an abutment to provide as an external connection, the abutment having a screw access channel;
   a dental insert, comprising:
   a spherical body of a medical grade elastomer, the body having a circumference with a plurality of outwardly extending projections of uniform size and shape distributed evenly about the circumference, the body being not more than 10 mm in diameter, as measured from an outer extremity of the projections;
   wherein the dental insert is inserted into the screw access channel to prevent contaminants from entering the screw access channel.

2. The combination of claim 1, wherein the medical grade elastomer is a thermoplastic elastomer (TPE).

3. The combination of claim 1, wherein the projections are resilient flexible spikes.

* * * * *